(12) United States Patent
Parunak et al.

(10) Patent No.: US 7,480,395 B2
(45) Date of Patent: Jan. 20, 2009

(54) DECENTRALIZED DETECTION, LOCALIZATION, AND TRACKING UTILIZING DISTRIBUTED SENSORS

(75) Inventors: H. Van Dyke Parunak, Ann Arbor, MI (US); Sven Brueckner, Stockbridge, MI (US)

(73) Assignee: TechTeam Government Solutions, Inc., Southfield, MI (US)

( * ) Notice: Subject to any disclaimer, the term of this patent is extended or adjusted under 35 U.S.C. 154(b) by 701 days.

(21) Appl. No.: 10/456,221

(22) Filed: Jun. 6, 2003

(65) Prior Publication Data

US 2003/0228035 A1 Dec. 11, 2003

Related U.S. Application Data

(63) Continuation-in-part of application No. 10/352,288, filed on Jan. 27, 2003.

(60) Provisional application No. 60/386,688, filed on Jun. 6, 2002.

(51) Int. Cl.
G06K 9/00 (2006.01)
(52) U.S. Cl. .................................... 382/103
(58) Field of Classification Search ................. 382/103; 709/200, 224; 340/565
See application file for complete search history.

(56) References Cited

U.S. PATENT DOCUMENTS 5,307,289 A * 4/1994 Harris ......................... 700/90
6,885,303 B2 * 4/2005 Payton et al. ............... 340/565
7,113,746 B2 * 9/2006 Payton et al. .............. 455/41.2
2003/0154262 A1 * 8/2003 Kaiser et al. ................ 709/219

OTHER PUBLICATIONS

Wax et al, "Decentralized Processing In Sensor Arrays", IEEE transactions on acoustics, speech, and signal processing, vol. ASSP-33, No. 4, Oct. 1985.*

* cited by examiner

Primary Examiner—Tom Y Lu
(74) Attorney, Agent, or Firm—Gifford, Krass, Sprinkle, Anderson & Citkowski, P.C.

(57) ABSTRACT

A swarming agent architecture provides a distributed, decentralized, agent-based computing environment applicable to ground-based surveillance. The approach, called Sensor Network Integration through Pheromone Fusion, or "SNIPF," provides an end-to-end demonstration that integrates self-contained sensor/communication nodes with novel swarming algorithms to detect foot and vehicular movement through a monitored area with minimal configuration and maintenance. A plurality of computational nodes distributed within the environment and, depending upon the way in which they are deployed, the various nodes are operative to sense the local environment, receive a message from a neighboring node, and transmit a message to a neighboring node. Given these capabilities, the nodes can collectively determine the presence and/or movement of a target and communicate this information to a user. Though not required, the system may include nodes that are capable of collectively determining the speed and heading of a target, and the gathered intelligence may be communicated to users within, and external to, the environment. A particularly useful configuration may include one or more 'free' nodes having relatively limited communications and computational power, and one or more anchor nodes equipped with GPS and/or long-distance communications capabilities.

37 Claims, 3 Drawing Sheets

DECENTRALIZED DETECTION, LOCALIZATION, AND TRACKING UTILIZING DISTRIBUTED SENSORS

REFERENCE TO RELATED APPLICATION

This application claims priority from U.S. Provisional Patent Application Ser. No. 60/386,688, filed Jun. 6, 2002; and is a continuation-in-part of U.S. patent application Ser. No. 10/352,288, filed Jan. 27, 2003. The entire content of each application is incorporated herein by reference.

FIELD OF THE INVENTION

This invention relates generally to person and object tracking and, in particular, to a distributed, decentralized agent-based computing environment applicable to maintaining surveillance over a geographic region.

BACKGROUND OF THE INVENTION

Modern military engagements require detecting and monitoring the movement of people and resources, both military and civilian, in real time over a wide area with little direct human supervision. This problem poses a number of challenges to conventional sensing and data processing technologies. In the context of such behavior, it has become increasingly difficult to automatically detect such movements, since the relevant patterns may exist on many disparate levels. In some situations, combinations of geographical movement of personnel, vehicles and objects may need to be analyzed simultaneously. Currently this is a very human-intensive operation, typically requiring numerous individuals.

Active monitoring of human and non-human movement involves the detection and classification of spatio-temporal patterns across a large number of real-time data streams. Approaches that analyze data in a central computing facility tend to be overwhelmed with the amount of data that needs to be transferred and processed in a timely fashion. Also, centralized processing raises proprietary and privacy concerns that may make many data sources inaccessible.

The detection and classification of subtle changes in an activity requires the integration of a wide variety of non-specific real-time data sources into the operation of the tracking system. Furthermore, to guarantee the early detection of a suspicious or critical movement, the system must operate on real-time data that is continuously updated. As a result, there is an immense amount of data that needs to be processed in a timely fashion.

Our co-pending U.S. patent application Ser. No. 10/352, 288, entitled "Swarming Agents For Distributed Pattern Detection and Classification," incorporated herein by reference, describes a swarming agent architecture for the distributed detection and classification of spatio-temporal patterns in a heterogeneous real-time data stream. The invention is not limited to geographic structures or patterns in Euclidean space, and is more generically applicable to non-Euclidean patterns such as topological relations in abstract graph structures. According to this disclosure, large populations of simple mobile agents are deployed in a physically distributed network of processing nodes. At each such node, a service agent enables the agents to share information indirectly through a shared, application-independent runtime environment. The indirect information sharing permits the agents to coordinate their activities across entire populations. The architecture may be adapted to the detection of various spatio-temporal patterns and new classification schemes may be introduced at any time through new agent populations. The system is scalable in space and complexity due to the consequent localization of processing and interactions. The system and method inherently protect potentially proprietary or private data through simple provable local processes that execute at or near the actual source of the data. The fine-grained agents, which swarm in a large-scale physically distributed network of processing nodes, may be designed to perform three major tasks: 1) they may use local sensors to acquire data and guide its transmission; 2) they may fuse, interpolate, and interpret data from heterogeneous sources, and 3) they may make or influence command and control decisions. In contrast to previous approaches involved with command and control, or data acquisition and transmission, such an approach facilitates a swarming agent architecture for distributed pattern-detection and classification.

SUMMARY OF THE INVENTION

This invention extends the concept of a swarming agent architecture to provide a distributed, decentralized agent-based computing environment applicable to ground-based surveillance. The approach, called Sensor Network Integration through Pheromone Fusion, or "SNIPF," provides an end-to-end demonstration that integrates self-contained sensor/communication nodes with novel swarming algorithms to detect foot and vehicular movement through a monitored area with minimal configuration and maintenance.

In the preferred embodiment, a decentralized tracking system according to the invention includes a plurality of computational nodes distributed within an environment. Depending upon the way in which they are deployed, the various nodes are operative to sense the local environment, receive a message from a neighboring node, and transmit a message to a neighboring node. Given these capabilities, the nodes can collectively determine the presence and/or movement of a target and communicate this information to a user.

Though not required, the system may include nodes that are capable of collectively determining the speed and heading of a target, and the gathered intelligence may be communicated to users within, and external to, the environment. A particularly useful configuration may include one or more 'free' nodes having relatively limited communications and computational power, and one or more anchor nodes equipped with GPS and/or long-distance communications capabilities.

Important characteristics of the system and method are summarized in Table 1.

TABLE 1

SNIPF Characteristics

| Challenge | SNTPF |
|---|---|
| Logistics footprint is critical if sensors must cover large area and cannot be retrieved. | SNIPF nodes are <200 g, <100 cm$^3$, <$200 each |
| Network must be configured once in place. | SNIPF configures itself. |
| Maintenance on in situ nodes is impossible. | SNIPF is robust to failure of individual nodes. Battery life is months to a year. Network has self-replenishment capability to reinforce weakened areas. |
| Long-haul communications is a power drain and introduces data latency. | SNIPF processes data in the network rather than at a central location. |
| Communications among nodes may be intercepted by enemy | SNIPF messages are meaningful only in the context of the whole system, and are useless to an interceptor. |

TABLE 1-continued

SNIPF Characteristics

| Challenge | SNTPF |
| --- | --- |
| Different targets require different sensors | SNIPF can integrate multiple sensory modalities (e.g., acoustical, magnetic, vibration), and run on different platforms with minimal reconfiguration, depending on mission requirements. |
| Fire support requires precise and unbiased Tactical Target Location (TTL) | SNIPF can achieve a circular error probable on the order of tens of meters. |
| Information from a sensor network may be used in different ways | SNTPF can report to a central command, coordinate unmanned vehicles for target verification and attack, and guide SOF personnel on the ground. |

DETAILED DESCRIPTION OF THE INVENTION

As discussed in the Background of the Invention, SNIPF is based on swarm intelligence [1,3], a new approach to information processing that uses the interactions among processors as well as computation within processors to detect, analyze, and respond to sensory input. This approach contrasts with other approaches in common use.

SNIPF processes sensory data in situ, not centrally, in contrast to data mining and data warehousing approaches. In contrast to conventional artificial intelligence approaches, processing is numerical, utilizing insect-inspired digital "pheromones," and not symbolic implementations. Spatial reasoning draws on each node's location and the limited neighborhood induced by short radio range, rather than using an explicit representation of space, thus different from traditional signal processing.

Figure 1:
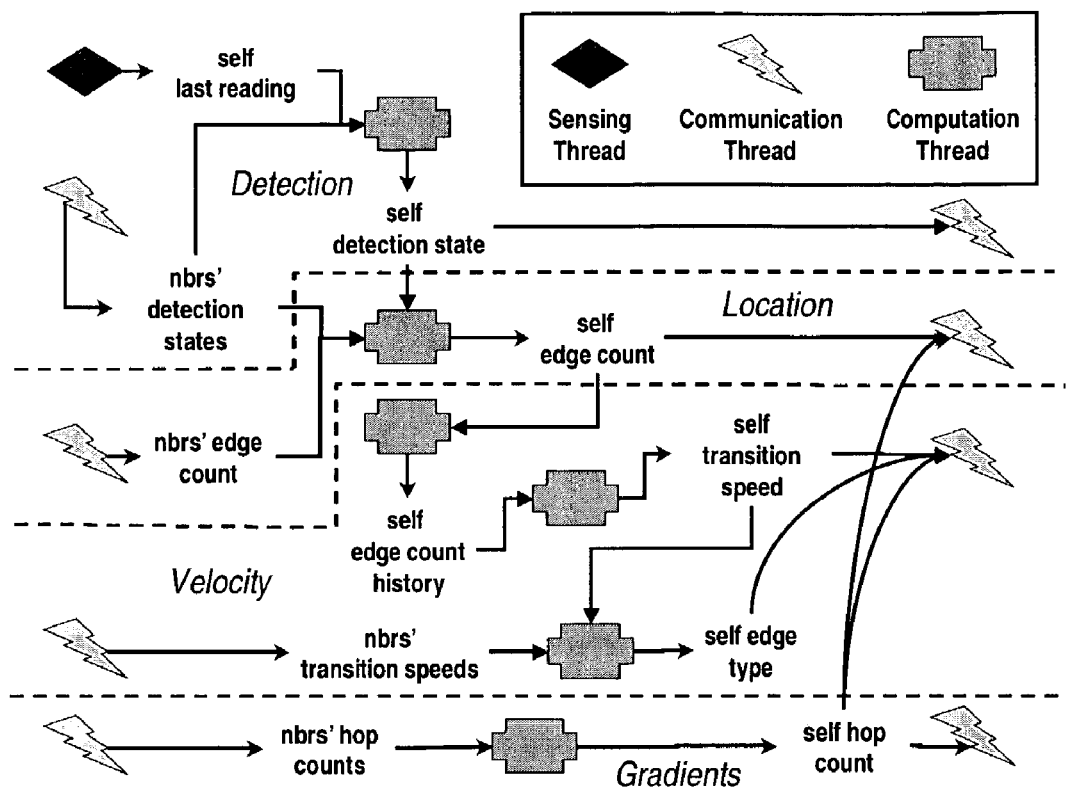
FIG. 1 is a block diagram of a single node in an environment according to the invention.

Each node interacts with its environment in three ways. It reads its local sensors, receives messages broadcast by nearby neighbors, and broadcasts messages that can be received by nearby neighbors. Such a sensor field can detect the presence of a target, localize it, determine its velocity (speed and heading), and communicate this information to users, both external to the sensor field and within it, using only a few thousand bytes of software and requiring only a few hundred bytes per second of bandwidth. FIG. 1 is a block diagram of a single SNIPF node, the operation of which is explained in the following sections.

Network Configuration

A SNIPF network has two kinds of nodes. Most nodes (~95%) are free, with only limited communications and computational power. The nodes are inexpensive and they can run for a long time on small batteries. A few nodes are anchors, with GPS and long-haul communications (e.g., satellite) to transmit the net's findings to commanders. Each node has a unique identifier.

Figure 2:
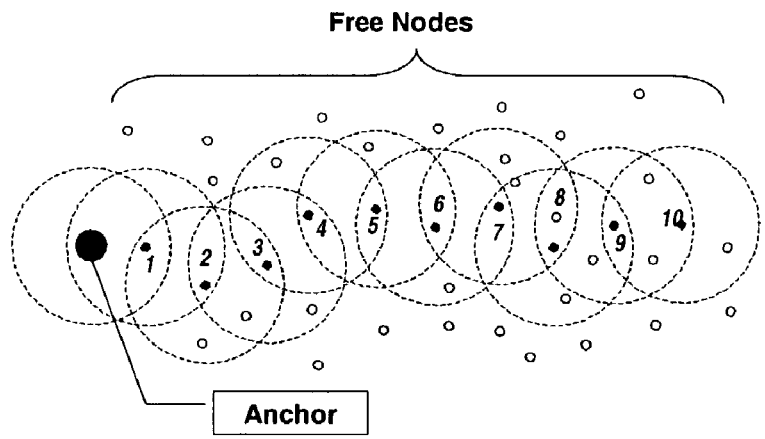
FIG. 2 shows how nodes are distributed randomly over a battlespace or other environment of interest.

Both kinds of nodes are distributed randomly over the battlespace or other environment of interest (FIG. 2). Their density depends on the range of the sensors deployed, their communications range, the nature of the targets, and the type of tracking required. Continuous tracking in SNIPF depends on the target's being visible to several nodes at a time. With hardware currently available, densities between $1/10$ $m^2$ and $1/100$ $m^2$ are appropriate, and smaller densities are possible when detecting but not tracking targets. These figures are given by way of example and not restriction; other hardware might permit the use of a wider range of densities without departing from the essence of this invention.

Once on the ground (or in water), the nodes self-configure and construct gradients to the anchors. These activities repeat periodically (e.g., daily) to account for lost nodes. To reduce message size, nodes define locally unique identifiers. In the preferred implementation, 6 bits are adequate for these identifiers. Each anchor broadcasts its identity and a hop count (initially zero). Every receiving node (FIG. 1, "Gradients") checks whether it has heard a higher hop count from the same anchor. If not, it is on the expanding front of messages, so it increments the hop count and broadcasts the modified message. Each node remembers its minimum hop count from each anchor. Hop counts (FIG. 2) define a gradient to route target reports to the anchor, and locate each node if there are at least three non-colinear anchors.

Once in place, the nodes interact in a sensing cycle whose frequency depends on the expected rate of change in the environment. For example, to track vehicles moving on the order of 30 km/h=8.3 m/sec, nodes spaced on average 10 m apart need a sensing cycle of 0.5 sec to guarantee that they see the target when it is in their zone. For pedestrians, cycles of 10 sec suffice, while monitoring construction of a stationary facility could use cycles of several minutes or even hours.

Detecting a Target

Figure 3:
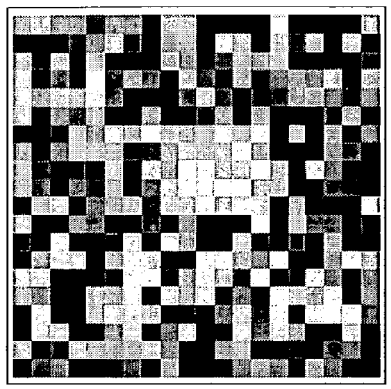
FIG. 3 shows simulated raw sensor readings on a 20×20 grid.

For discussion, we assume that a node's sensor responds to targets in its environment by generating a signal $\sigma \in [0,1]$. $\sigma$ may be a primary sensor reading, the output of a "sensor fusion function" that combines readings from multiple sensors, the time rate of change of a sensor instead of its absolute reading, or other derivative data that will be obvious to one skilled in the art of sensor processing. In the preferred implementation, $\sigma$ is normalized to fall in the range $\in [0,1]$, but the method here taught may be applied to other ranges as well. FIG. 3 shows simulated raw sensor readings on a 20×20 grid. The eye can detect a bright area just NE of center where the target is located. If all sensor readings were piped to a central processor, conventional signal processing techniques could also detect this region, but such a data pipe is unrealistic under our power constraints.

Figure 4:
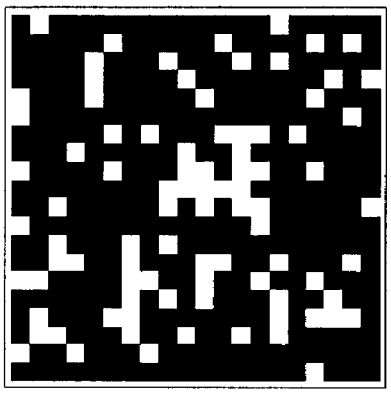
FIG. 4 shows nodes whose sensors individually exceed the threshold.

The node translates $\sigma$ (a real number) to a binary detection indication, using a threshold $\theta$ that falls in the open interval corresponding to the range of $\sigma$ (in the preferred implementation, $\theta \in (0,1)$). If $\sigma \geq \theta$, the node concludes that it sees a target; if $\sigma < \theta$, it ignores the signal. FIG. 4 shows (in white) nodes whose sensors individually exceed the threshold. Local sensor anomalies such as noise result in an obscure picture.

SNIPF uses neighbor corroboration (FIG. 1, "Detection"). Each node periodically receives a message from each nearby node indicating whether or not the neighbor senses a target. Proximity among nodes makes it unlikely that only one node would see a target. A node's threshold for mapping its sensor signal to a detection decision varies with the percentage of its neighbors that sense a target, according to a sigmoid function. An example of such a function is $\theta+\delta-2\delta/1+e^{-r(p-0.5)}$, where p is the percentage of neighbors that detect the target, r adjusts steepness, and $\delta$ is the maximum deviation from the base threshold, but one skilled in the art will recognize that other sigmoid functions may be used without departing from the essence of this invention. If all neighbors detect a target, the node's threshold drops to $\theta-\delta$, accepting signals that would otherwise be rejected. If no other neighbors detect a target, the threshold rises to $\theta+\delta$, rejecting readings that would otherwise trigger detection. This neighborhood interaction improves the sensitivity of the network while reducing false alarms.

Figure 5:
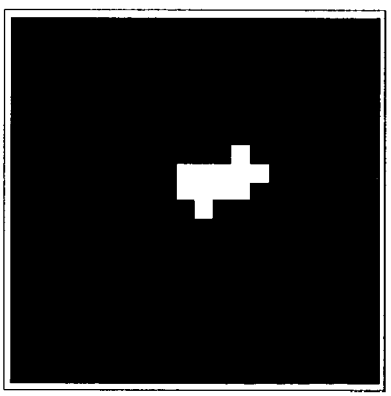
FIG. 5 shows the detecting neighborhood produced by applying neighbor corroboration to the sensor readings in FIG. 3.

FIG. 5 shows the detecting neighborhood produced by applying neighbor corroboration to the sensor readings in FIG. 3. It clearly identifies the bright region in the original data and suppresses spurious readings. In spite of the power of this technique, it requires each node to transmit only one bit per sensing cycle, and to receive only n bits, where n is the number of neighbors within communication range.

Table 2 compares SNIPF's detection algorithm with other common data fusion architectures.

TABLE 2

Common Distributed Detection Architectures [6]

| Architecture | Comparison with SNIPF |
|---|---|
| Parallel Fusion Network | Requires Data Fusion Center that can communicate with all nodes |
| Serial Network | Assumes fixed node order; result not locally known |
| Tree Network | Assumes fixed node arrangement; result not locally known |
| Feedback Network | Requires Data Fusion Center and global communications |
| Neighborhood Medians/Avgs | Nodes must exchange real #'s instead of single bits Iteration reduces effective dynamic range of sensors |
| SNIIPF | No fusion center; low-power local communications; arbitrary relation of nodes to targets; result locally known (e.g., to coordinate mobile units); uses full dynamic range of sensors |

Target Location (FIG. 1, "Location")

Figure 6:
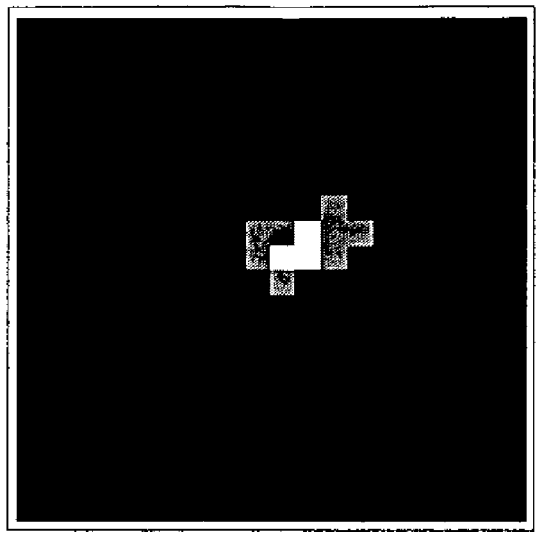
FIG. 6 illustrates a result with edge nodes, gray and central nodes.

Once detected, a target must be located geographically. Of all the nodes that detect the target, those closest to it must recognize that they are the closest. The percentage p of a node's neighbors that detect the target will be higher for a node closer to the target than for one far away. An "edge node" is one that detects the target and whose p is less than $\phi\in(0,1)$. Nodes that detect the target but are not edge nodes must be one step closer to the target, and so forth. Nodes already know whether they are edge nodes as a result of target detection. To locate the target, detecting nodes construct a gradient using a small integer (four bits in the preferred implementation) indicating their distance from the edge. A detecting node that hears no edge distance greater than its own knows that it is farthest from the edge, and thus that it is a nearest node. FIG. 6 shows the result, with edge nodes (edge distance 1) colored gray and central nodes (edge distance 2) colored white. Since sensor location is our main estimator of target location, precision and bias of tactical target location (TTL) are directly dependent on sensor density and its relation to sensor range (that is, the number of sensors that detect a given target).

Determining Target Velocity (FIG. 1, "Velocity")

A node estimates target velocity by maintaining a short history (ten steps in the preferred implementation) of its edge distance and measuring how fast it changes. A node in line with the target's vector sees the highest rate of change in its edge distance, while a node on the edge of the detecting range at the maximum distance from the line of movement sees the slowest. A gradient mechanism identifies the nodes of highest change. Their rate of change estimates the target's speed, and their position estimates its direction.

Communications

The sensor net must communicate information about the presence, location, and velocity of the target to other blue units. SNIPF provides two mechanisms for this communication. First, messages can diffuse up gradients to the nearest anchor, whose higher-power radio can pass the information on to a remote headquarters. Second, SNIPF can use target information locally to attract mobile resources, such as SOF personnel or unpiloted robotic vehicles. The mobile entity listens to broadcasts from the nodes. A node that determines that it is closest to the target generates a gradient. Mobile entities climb this gradient to reach the target.

Multiple Target Types

For simplicity, this discussion has assumed a single type of target with a single sensor configuration. It will be apparent to one skilled in the art that SNIPF can handle multiple target types requiring different sensor configurations, by adding a tag to each message indicating the target type with which the message is concerned. Required bandwidth is linear in the number of different sensor configurations.

Hardware Platform

Figure 7:
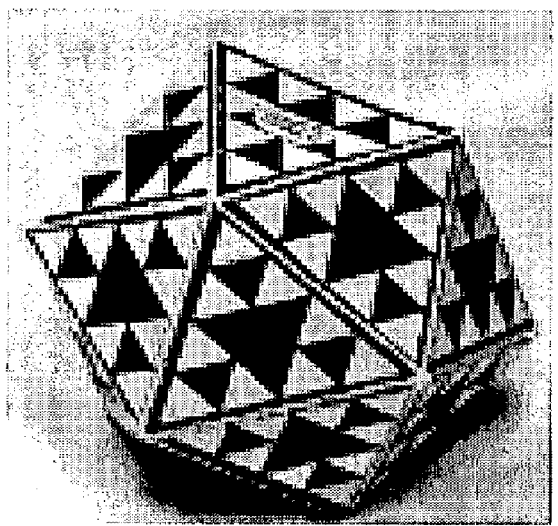
FIG. 7 shows a multi-frequency Hausdorff antenna applicable to the invention for channelizing ambient electromagnetic radiation.

The SNIPF algorithms are extremely robust and economic of processor and communications resources. An anticipated prototype will use a multi-sensor board that includes an acoustic sensor with tone decoder with a range of 6 m@60 db, a magnetometer that can sense a truck at 10 m, and a 2-axis accelerometer with 2 mg sensitivity. Other sensors can be interfaced for additional sensing tasks (e.g., chem./bio sensors, or the multi-frequency Hausdorff antenna shown in FIG. 7 to channelize ambient electromagnetic radiation for ELINT and SIGINT.

SNIPF can track any entity for which a sensor exists that can function at a range on the order of the communication range. The prototype's sensor suite will be sensitive to targets such as light trucks, talking humans, and animal-drawn carts as well as more traditional military forces and equipment. The HW supports any sensor, and SNIPF (unlike conventional AI or data mining algorithms) makes no assumptions about the nature of the sensors, so the system can be extended easily. One skilled in the art will appreciate that the hardware details described here are by way of example and not restriction, and that the essence of the invention can be applied to other hardware platforms.

Replenishment

The inventive system may optionally repair a net when some nodes die or are removed. If a node detects that the number of its neighbors has dropped, it generates a gradient leading to itself. A lightweight unpiloted robotic vehicle equipped with a new node drops the new node in the area of the attracting node, thus increasing the net's local density and repairing the breach. Refinements of this scheme are possible. For example, if the net detects increased activity in an area previously quiescent the density of nodes in that area can be increased to provide finer resolution of sensing.

Potential users of SNIPF include SOF (via handheld computers with SNIPF-compatible radios), central command (using information exported from the network to identify events requiring further attention), and local commands (who will be interested in exported information, and in addition may deploy unpiloted vehicles such as UAV's or UGV's to move within the sensor field in response to detected targets). SNIPF can also be used by security personnel for perimeter monitoring in military and civilian applications.

REFERENCES

[1] E. Bonabeau, M. Dorigo, and G. Theraulaz. *Swarm Intelligence: From Natural to Artificial Systems*. New York, Oxford University Press, 1999.
[2] Crossbow. MICA Wireless Measurement System. 2002. PDF file, http://www.xbow.com/Products/Product_pdf_files/MICA%20data%20sheet.pdf.
[3] H. V. D. Parunak. 'Go to the Ant': Engineering Principles from Natural Agent Systems. *Annals of Operations Research*, 75:69-101, 1997. URL http://www.erim.org/~vparunak/gotoant.pdf.
[4] K. Pister. UCB/MLB 29 Palms UAV-Dropped Sensor Network Demo. 2001. Web page, http://www-bsac.eecs.berkeley.edu/~pister/29Palms0103/.
[5] U.C. Berkeley. TinyOS Home Page. 2002. Web page, http://today.cs.berkeley.edu/tos/.
[6] P. K. Varshney. *Distributed Detection and Data Fusion*. New York, Springer, 1997.

We claim:

1. A decentralized tracking system, comprising:
   a plurality of computational nodes distributed within an environment, including nodes operative to perform the following functions:
      a) sense the local environment,
      b) receive a message from a neighboring node, and
      c) transmit a message to a neighboring node; and
   wherein at least a subset of the nodes are operative to:
      a) define locally unique identifiers, and
      b) collectively determine the presence and/or movement of a target and communicate this information to a user.

2. The system of claim 1, including nodes that are capable of collectively determining the speed and heading of the target.

3. The system of claim 1, including nodes that are capable of communicating the information to users within, and external to, the environment.

4. The system of claim 1, including:
   one or more free nodes having relatively limited communications and computational power; and
   one or more anchor nodes equipped with long-distance communications capabilities.

5. The system of claim 1, including:
   one or more free nodes having relatively limited communications and computational power; and
   one or more anchor nodes equipped with global-positioning satellite receiving and long-distance communications capabilities.

6. The system of claim 1, wherein the environment is sensed using optical sensors.

7. A method of tracking the movement of a target within an environment, comprising the steps of:
   distributed a plurality of self-contained computational nodes within the environment each node including a unique identifier, including free nodes having limited relatively limited communications capabilities;
   sensing target information using local interactions among the free nodes.

8. The method of claim 7, wherein the free nodes are accompanied by at least one anchor node equipped with long-distance communications capabilities; with the additional steps of
   communicating the target information from each free node sensing the target to the anchor node; and
   communicating the target information to an observer.

9. The method of claim 7, wherein the target information is sensed visually.

10. The method of claim 7, wherein the target information includes the directional movement of a person or object within the environment.

11. The method of claim 7, wherein the target information includes velocity.

12. The method of claim 7, wherein the nodes are randomly distributed within the environment.

13. The method of claim 7, wherein the density of the nodes depends on sensing range.

14. The method of claim 7, wherein the density of the nodes depends on communications range.

15. The method of claim 7, wherein the density of the nodes depends on the nature of the targets.

16. The method of claim 7, wherein the density of the nodes depends on the type of tracking.

17. The method of claim 7, wherein the density is such that the target is visible to several nodes at a time.

18. The method of claim 7, wherein the density is in the range of $1/10$ m2 and $1/100$ m2.

19. The method of claim 7, wherein the nodes self-configure and construct gradients to the anchors.

20. The method of claim 7, further including the step of repeating one or more operations to account for lost nodes.

21. The method of claim 7, wherein each anchor broadcasts its identity and a hop count.

22. The method of claim 7, wherein a node determines whether it detects a target by comparing its reading to a threshold.

23. The method of claim 7, wherein a node determines whether it detects a target by comparing its reading to a threshold that varies depending on the percentage of its neighbors that also detect a target.

24. The method of claim 7, wherein a node determines whether it detects a target by comparing its reading to a threshold that varies according to a sigmoid function depending on the percentage of its neighbors that also detect a target.

25. The method of claim 7, wherein a node determines whether it is on an edge of the group of nodes that detect a target by comparing the percentage of its neighbors that also detect the target with a threshold.

26. The method of claim 7, wherein a node estimates its distance from a detected target by propagating the estimates of its neighbors of how far they are from the nodes farthest from the target.

27. The method of claim 7, wherein a node recognizes that it is as close as any other node to the target by listening to the edge distance estimates of its neighbors and hearing none that is greater than its own.

28. The method of claim 7, wherein a node estimates the velocity of a target by tracking the rate of change of the node's distance from the edge of the set of nodes that detect the target.

29. The method of claim 7, wherein a node estimates the velocity of a target by tracking the rate of change of the node's distance from the edge of the set of nodes that detect the target and disseminates this information to neighboring nodes with a gradient mechanism.

30. The method of claim 7, wherein each receiving node performs a test to determine whether it has heard a higher hop count from the same anchor and, if not, concludes that it is on an expanding message front, increments the hop count and broadcasts the modified message.

31. The method of claim 7, wherein each node remembers its minimum hop count from each anchor.

32. The method of claim 7, wherein the counts define a gradient to route target reports to the anchor, and locate each node if there are at least three non-colinear anchors.

33. The method of claim 7, wherein, once in position, the nodes interact in a sensing cycle whose frequency depends on the expected rate of change in the environment.

34. The method of claim 7, using a sensing cycle on the order of 0.5 sec to track vehicles.

35. The method of claim 7, using a sensing cycle on the order of 10 sec to track pedestrians.

36. The method of claim 7, using a sensing cycle of several minutes to an hour or more to track the construction of a building or other facility.

37. The method of claim 7, wherein the system tracks multiple target types by tagging messages among nodes to indicate the target type with which the message is concerned.

* * * * *

UNITED STATES PATENT AND TRADEMARK OFFICE
CERTIFICATE OF CORRECTION

PATENT NO. : 7,480,395 B2
APPLICATION NO. : 10/456221
DATED : January 20, 2009
INVENTOR(S) : Henry VanDyke Parunak et al.

It is certified that error appears in the above-identified patent and that said Letters Patent is hereby corrected as shown below:

Column 2, line 54, replace "SNTPF" with --SNIPF--

Column 3, line 5, replace "SNTPF" with --SNIPF--

Column 8, line 32, replace "1/10 m2 and 1/100 m2" with --1/10 $m^2$ and 1/100 $m^2$--

Signed and Sealed this

Ninth Day of June, 2009

JOHN DOLL
*Acting Director of the United States Patent and Trademark Office*